United States Patent
Hayashi

(10) Patent No.: US 7,711,710 B2
(45) Date of Patent: May 4, 2010

(54) ELECTRONIC APPARATUS, CONTENT RECORDING METHOD, AND PROGRAM THEREFOR

(75) Inventor: Morihiko Hayashi, Kanagawa (JP)

(73) Assignee: Sony Corporation (JP)

(*) Notice: Subject to any disclaimer, the term of this patent is extended or adjusted under 35 U.S.C. 154(b) by 313 days.

(21) Appl. No.: 11/784,525

(22) Filed: Apr. 5, 2007

(65) Prior Publication Data

US 2008/0040403 A1 Feb. 14, 2008

(30) Foreign Application Priority Data

Apr. 10, 2006 (JP) .......................... P2006-107298

(51) Int. Cl.
G06F 7/00 (2006.01)
G06F 17/00 (2006.01)

(52) U.S. Cl. .................. 707/640; 707/652; 711/162; 714/748

(58) Field of Classification Search ............... 707/1–10, 707/100–104.1, 200–206; 369/7, 13.35, 369/13.56, 30.32, 44.3, 47.1; 711/161, 162; 714/748

See application file for complete search history.

(56) References Cited

U.S. PATENT DOCUMENTS

2005/0254788 A1* 11/2005 Yamagata et al. ............. 386/94
2005/0262496 A1 11/2005 Seki et al.

FOREIGN PATENT DOCUMENTS

| JP | 2001-169250 A | 6/2001 |
| JP | 2001-359050 A | 12/2001 |
| JP | 2003-219326 A | 7/2003 |
| JP | 2003-284037 A | 10/2003 |
| JP | 2005-338959 A | 12/2005 |

OTHER PUBLICATIONS

Berhe et al., Distributed content adaptation for pervasive systems, Apr. 4-6, 2005, IEEE, vol. 2, 234-241.*

Hye Joo Lee et al., Design of protection and distribution service model for digital broadcasting content, Jun. 27-30, 2004, IEEE, vol. 1, 193-196.*

* cited by examiner

Primary Examiner—Jean B Fleurantin
(74) Attorney, Agent, or Firm—Lerner, David, Littenberg, Krumholz & Mentlik, LLP

(57) ABSTRACT

An electronic apparatus communicable with another electronic apparatus via a network is disclosed. The electronic apparatus may include receiving means for receiving a content recorded on a first recording medium of the other electronic apparatus from the other electronic apparatus, determining means for determining whether the received content is reproducible or irreproducible by decoding the content, and recording means for recording the content on a second recording medium if the content is determined to be reproducible.

11 Claims, 7 Drawing Sheets

| Title | DVR Name (URL) | Model Name |
|---|---|---|
| Content A | Living Room DVR (192.168.128.1) | DVR-xyz |
| Content C | 2F DVR (192.168.128.2) | DVR-abc-1 |
| Content F | Living Room DVR (192.168.128.1) | DVR-xyz |
| Content N | Father DVR (192.168.128.3) | DVR-xyz |
| Content B | Father DVR (192.168.128.3) | DVR-xyz |
| Content D | 2F DVR (192.168.128.2) | DVR-abc-1 |
| Content P | Living Room DVR (192.168.128.1) | DVR-xyz |
| ⋮ | ⋮ | |

Higher ↑ Priorities ↓ Lower

FIG.7

| Title | DVR Name (URL) | Reproduction Determination |
|---|---|---|
| Content A | Living Room DVR (192.168.128.1) | Confirmed(OK) |
| Content C | 2F DVR (192.168.128.2) | Confirmed(OK) |
| Content F | Living Room DVR (192.168.128.1) | Confirmed(NG) |
| Content N | Father DVR (192.168.128.3) | Confirmed(OK) |
| Content B | Father DVR (192.168.128.3) | Confirmed(NG) |
| Content D | 2F DVR (192.168.128.2) | Unconfirmed |
| ⋮ | ⋮ | ⋮ |

Higher ↑ Priorities ↓ Lower

FIG.8

ELECTRONIC APPARATUS, CONTENT RECORDING METHOD, AND PROGRAM THEREFOR

CROSS-REFERENCE TO RELATED APPLICATIONS

This application claims priority from Japanese Patent Application No. JP 2006-107298 filed in the Japanese Patent Office on Apr. 10, 2006, the entire content of which is incorporated herein by reference.

BACKGROUND OF THE INVENTION

1. Field of the Invention

The present invention relates to an electronic apparatus capable of recording a content such as video, a content recording method, and a program therefor.

2. Description of the Related Art

In recent years, a network system in which contents can be reproduced in a plurality of places in the home by interconnecting a plurality of electronic apparatuses such as a video recorder and a television via a network such as a home network (home LAN (Local Area Network)) and exchanging contents such as video among the respective electronic apparatuses is proposed.

When a content is copied or transferred (so-called moved) from some apparatus to a storage device such as a HDD of another electronic apparatus or a medium such as an optical disc such as a DVD (Digital Versatile Disk) or a BD (Blu-ray Disc (registered trademark)) via a network in such a system, the content sometimes turns out to be irreproducible after being copied or moved. In this case, useless copy processing is performed, and when writing on an only once writable medium such as a DVD–R is performed, this medium may be wasted. Further, concerning a copyrighted content, by a content of a source of movement being erased, the content itself may be lost.

In relation to processing when a content is copied or reproduced via the network an information processing device which, when the content is copied or reproduced, acquires a non-permission list describing types or versions of applications inappropriate for this copying or reproduction and a startup file describing types and versions of applications appropriate for the copying or reproduction of the content from the outside, specifies an application installed in itself based on the startup file, and verifies the specified application against the non-permission list so as to be able to prevent execution of the application described in the non-permission list is described (see Japanese Patent Application Laid-Open No. 2005-338959 (Paragraph [0008], FIG. 8, etc.).

SUMMARY OF THE INVENTION

However, in a technology described in the above document, it is necessary to acquire the above non-permission list and startup file from an external Web server, for example, via the Internet in order to determine whether execution of an application to copy or reproduce a content is permitted or not. Accordingly, it is difficult to acquire the above non-permission list and startup file, for example, under an environment where only a content providing side apparatus and a content using side apparatus are connected to a network (connected by a dedicated line), so that it is difficult to make the above determination of permission or non-permission.

Further, in the technology of the above patent document, the permission/non-permission of copying or reproduction of the content is determined with reference to information such as the type, version, and so on of the application, and hence even if the execution of the application is permitted when the content is copied, the content sometimes turns out to be irreproducible when being actually reproduced. For example, instead of a content, like the content in the above patent document, which is provided in a content delivery service and whose reproduction is guaranteed if a predetermined application is used, a content recorded, edited, or created by a user of another apparatus on his or her own, or the like is sometimes a content created in a different format or sometimes a content obtained by combining contents with plural formats even if its extension is the same as that of a content delivered from the above delivery service or the like. If copying of such a content is permitted, there are still dangers that a medium is wasted and the content is lost.

In view of the above circumstances, it may be desirable to provide an electronic apparatus capable of certainly preventing an irreproducible content from being copied or moved from another apparatus, a content recording method, and a program therefor.

According to a principal aspect of the present invention, there is provided an electronic apparatus communicable with another electronic apparatus via a network. The electronic apparatus may include receiving means for receiving a content recorded on a first recording medium of the other electronic apparatus from the other electronic apparatus, determining means for determining whether the received content is reproducible or irreproducible by decoding the content, and recording means for recording the content on a second recording medium of the electronic apparatus if the content is determined to be reproducible.

Here, the electronic apparatus may be a recording/reproducing device such as a HDD (Hard Disk Drive) recorder, a DVD (Digital Versatile Disk) recorder, a BD (Blu-ray Disc (registered trademark)), or their combined recorder, a PC (Personal Computer) (which may be either a desktop or a notebook type), a portable audio/video player, a television (including a portable television), a portable telephone, a PDA (Personal Digital Assistant), a game machine, or any other electric appliance. The content may be video data such as a television program, audio data such as music, text data such as a so-called electronic book, or the like. The first recording medium may be, for example, a hard disk, a flash memory, or the like, and the second recording medium may be, for example, a hard disk, an optical disc such as a DVD (DVD-Video, DVD-RAM, DVD-R, DVD-RW, DVD+R, DVD+RW, or the like) or a BD (Blu-ray Disc (registered trademark)), any other magnetic optical disc, a semiconductor memory, or the like. The recording means may be a drive such as a HDD, a DVD drive, or a BD drive, a circuit including a flash memory, or the like.

Owing to the above constitution, the content may be copied or transferred (so-called moved) from the first recording medium of the other electronic apparatus to the second recording medium after whether the content is reproducible or irreproducible is confirmed, which can prevent the content recorded on the second recording medium from becoming irreproducible, and thereby prevent the second recording medium from being wasted and the content itself from being lost.

The above electronic apparatus may further include means for transmitting a retransmission request signal requesting retransmission of the content determined to be reproducible by the determining means to the other electronic apparatus, and the receiving means may receive the content retransmitted from the other electronic apparatus based on the retransmission request signal, and the recording means may record the retransmitted and received content.

Thus, the content may not be recorded on the second recording medium until the content is determined to be reproducible, so that, for example, the use area of the storage area can be extremely reduced compared to when the content is temporarily stored in a storage area such as a memory different from the above second recording medium at the time of determination.

The above electronic apparatus may further include a buffer memory for temporarily storing the received content, and the recording means may include means for transferring the content from the buffer memory to the second recording medium of the electronic apparatus if the content is determined to be reproducible by the determining means.

Hence, the processing burden can be reduced compared to when the content is received twice for determining whether the content is reproducible or irreproducible and for recording the content on the second recording medium.

The above electronic apparatus may further include reproducing means for reproducing the content recorded on the second recording medium by decoding the content at a first speed, and the determining means may decode the content at a second speed faster than the decoding speed by the reproducing means.

Consequently, the determination processing can be performed speedily compared to when the content is decoded at the same speed as the decoding speed in the reproducing means to determine whether the content is reproducible or irreproducible.

The above electronic apparatus may further include storing means for generating a reproducible/irreproducible list describing whether the content is reproducible or irreproducible based on a result of the determination and storing the reproducible/irreproducible list.

Here, the storing means may indicate a storage device such as the above flash memory or the HDD built in the electronic apparatus. Hence, by generating the above reproducible/irreproducible list and referring to this reproducible/irreproducible list, a certainly reproducible content can be immediately recorded, and an irreproducible content can be prevented from being uselessly recorded, which can improve user friendliness.

In the above electronic apparatus, the receiving means may receive attribute information on contents recorded on the first recording medium of the other electronic apparatus, the storing means may store preference degree information on the contents of a user, and the determining means may preferentially determine whether a content with a high preference degree out of the contents recorded on the first recording medium is reproducible or irreproducible, based on the received attribute information and the stored preference degree information.

Here, the attribute information may be, for example, metadata including a title, performer, category, and so on of the content, and, for example, it may be extracted from the above received content in some cases, extracted from received broadcast data in some cases, and received via a network such as the Internet in other cases. The content with the high preference degree may be, for example, a content with the same attribute information as a content recorded and reproduced to the end before in this electronic apparatus, such as a content with the same title, a content of the same category, or the like as a content recorded before in this electronic apparatus.

Thus, it may be preferentially determined whether a content with a possibility that the user's preference degree is high is reproducible or irreproducible, so that it can be immediately informed whether this content is reproducible or irreproducible as far as the content whose recording the user desires is concerned, which enables smooth recording processing.

The above electronic apparatus may further include means for performing control to display the reproducible/irreproducible list, and means for inputting a user operation requesting recording of the contents described in the reproducible/irreproducible list based on the displayed reproducible/irreproducible list.

Here, "performing control to display" is a concept which may include not only a case where the electronic apparatus includes a display means such as a display, but also a case where the electronic apparatus outputs data to be displayed on a television or a display device connected to the electronic apparatus. Hence, the user can allow only a reproducible content out of contents on the network to be easily recorded without being aware of the determination of whether it is reproducible or irreproducible since the content may be recorded on the recording medium in response to a content movement request from the user based on the reproducible/irreproducible list.

The above electronic apparatus may further include means for transmitting a conversion request information requesting to convert the content into a reproducible recording format if the content is determined to be irreproducible by the determining means, and the receiving means may receive the converted content from the other electronic apparatus.

Consequently, even if the content is recorded in an irreproducible recording format, the content can be reproduced by being converted into a recording format reproducible by the other apparatus and received. Here, the recording format may be a format such as a video format (compression format) such as MPEG-1 (Moving Picture Experts Group phase 1), MPEG-2, MPEG-4, or MPEG-4 AVC, an audio format (compression format) such as a linear PCM (Linear Pulse Code Modulation), Dolby digital (AC-3), DTS, ATRAC (Adaptive TRansform Acoustic Coding), MPEG-1 Audio, or MPEG-2 Audio (MPEG-2 Audio AAC (Advanced Audio Coding)), or a multiplexing format such as MPEG-2 PS (Program Stream) or MPEG-2 TS (transport Stream).

The above electronic apparatus may further include means for storing a first model information on a model of the electronic apparatus, the receiving means may receive a second model information on a model of the other electronic apparatus from the other electronic apparatus, and the determining means may determine that the content is reproducible without decoding the content when the stored first model information and the received second model information matches.

Here the model information may be, for example, a model name, a model ID, a serial number, or the like. Consequently, when the electronic apparatus and the other electronic apparatus are the same model of apparatus, the reproducible content may be speedily recorded on the second recording medium by omitting decoding processing.

A content recording method according to another aspect of the present invention is a content recording method by which an electronic apparatus communicable with another electronic apparatus via a network records a content. The content recording method may include receiving a content recorded on a first recording medium of the other electronic apparatus from the other electronic apparatus, determining whether the received content is reproducible or irreproducible by decoding the content, and recording the content on a second recording medium of the electronic apparatus if the content is determined to be reproducible.

A program that causes an electronic apparatus to function as an apparatus communicable with another electronic apparatus via a network according to yet another aspect of the present invention may include receiving a content recorded on a first recording medium of the other electronic apparatus from the other electronic apparatus, determining whether the received content is reproducible or irreproducible by decoding the content, and recording the content on a second recording medium of the electronic apparatus if the content is determined to be reproducible.

As described above, according to the aspects of the present invention, the irreproducible content can be certainly prevented from being copied or moved from the other apparatus.

BRIEF DESCRIPTION OF DRAWINGS

FIG. 7 is a diagram showing an example of a list of contents recorded on respective DVRs in the second embodiment of the present invention; and FIG. 8 is a diagram showing a reproducible/irreproducible list in the second embodiment of the present invention.

DETAILED DESCRIPTION

Next, with reference to the accompanying drawings, embodiments of the present invention will be described.

First Embodiment

Figure 1:
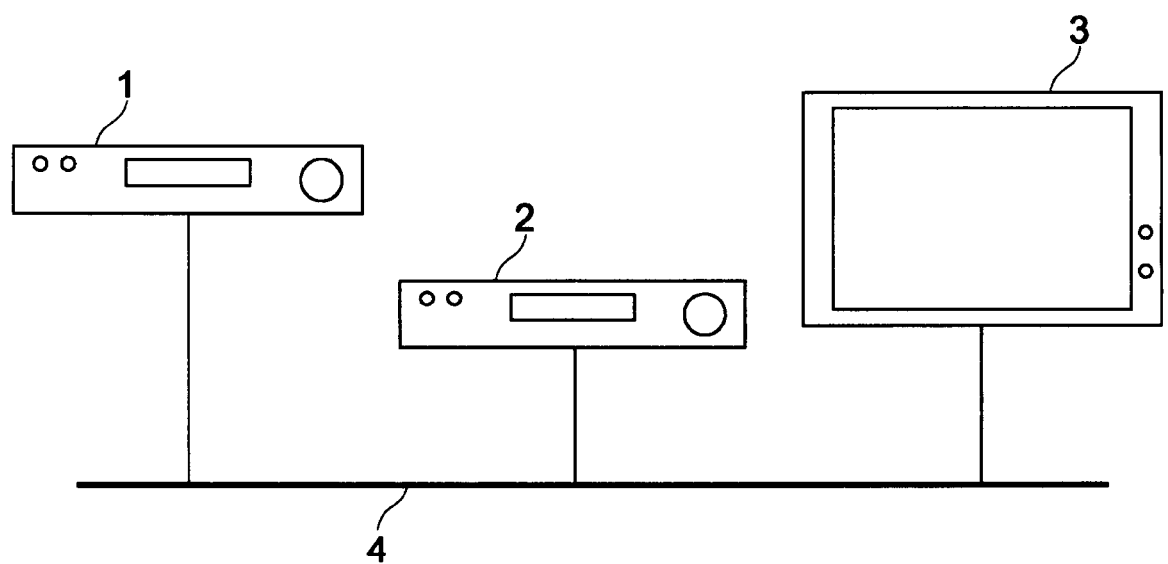
FIG. 1 is a diagram showing a schematic configuration of a system in which digital video recorders are connected according to a first embodiment of the present invention.

First, a first embodiment of the present invention will be described. FIG. 1 is a diagram showing a schematic configuration of a system in which digital video recorders are connected according to an embodiment of the present invention.

As shown in this figure, this system includes a digital video recorder 1 (hereinafter referred to as a DVR 1) and a digital video recorder 2 (hereinafter referred to as a DVR 2). The DVR 1 and the DVR 2 are connected to a network 4 (a so-called home LAN) such as Ethernet or a wireless LAN (Local Area Network) and can communicate with each other. In particular, in this embodiment, contents can be mutually exchanged (copied or moved) between the respective apparatuses via the network 4, for example, based on the DLNA (Digital Living Network Alliance guideline) specification. Further, the DVR 1 and the DVR 2 are connected to a digital television 3 (hereinafter referred to as a digital TV 3), respectively, by dedicated lines. The digital TV 3 has a display and a speaker (not shown) and can output a video signal and an audio signal transmitted from each DVR.

Figure 2:
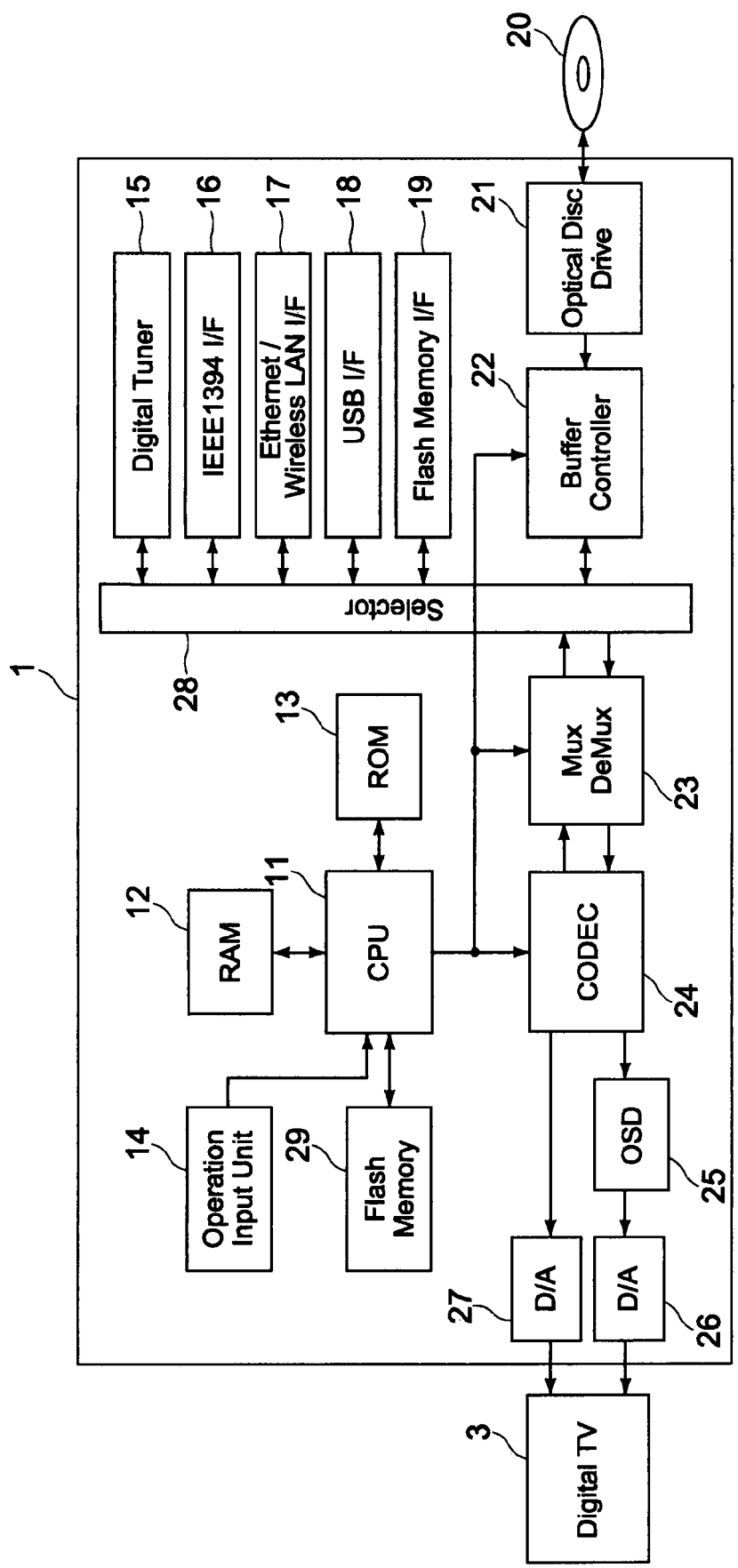
FIG. 2 is a block diagram showing a configuration of a DVR 1 according to the first embodiment of the present invention.

FIG. 2 is a block diagram showing a configuration of the above DVR 1. As shown in this figure, the DVR 1 includes a CPU (Central Processing Unit) 11, a RAM (Random Access Memory) 12, a ROM (Read Only Memory) 13, an operation input unit 14, a digital tuner 15, an IEEE1394 interface (I/F) 16, an Ethernet/wireless LAN interface 17, a USB (Universal Serial Bus) interface 18, a flash memory interface 19, an optical disc drive 21, a buffer controller 22, a Mux/Demux (multiplexer/demultiplexer) 23, a CODEC (COmpressor DECompressor) 24, an OSD (On-Screen Display) 25, D/A (Digital/Analog) converters 26 and 27, a selector 28, and a flash memory 29.

The CPU 11 accesses the RAM 12 or the like properly as necessary and wholly controls all of respective blocks of the DVR 1. The RAM 12 is a memory which is used as a working area of the CPU 11 or the like and temporarily holds an OS, programs, processing data, and so on. Further, the RAM 12 is also used as a buffering area of data for streaming reproduction received via the network 4. The ROM 13 is a nonvolatile memory in which the OS, programs, and firmware including various parameters to be executed by the CPU 11 are fixedly stored.

The flash memory 29 is a nonvolatile memory which stores, for example, the above OS, data on contents to be recorded on an optical disc 20, and so on.

The operation input unit 14 includes a button, a switch, a key, an indicator for operation confirmation, a light receiving part of an infrared signal transmitted from a remote controller (not shown), and so on, and receives inputs of various set values and commands given by the operation of a user and outputs them to the CPU 11.

In accordance with the control of the CPU 11, the digital tuner 15 selects a specific channel of digital broadcasting to receive broadcast data via an antenna not shown and demodulates the broadcast data, and via the selector 30, the resulting broadcast data is outputted to the Mux/Demux 23 and reproduced or recorded on the optical disc 20 via the buffer controller 22. The broadcast data is, for example, an MPEG stream compressed by an MPEG-2 TS format, but not limited to this format.

The IEEE1394 interface 16 is connectable to an external apparatus such as a digital video camera. For example, content data such as moving image data taken and recorded by the digital video camera can be reproduced or recorded on the optical disc 20 in the same manner as moving image data received by the above digital tuner 15.

The Ethernet/wireless LAN interface 17 receives inputs of content data such as moving image data and other data recorded on the above DVR 2 via the above network 4 such as Ethernet or the wireless LAN. This content data also can be reproduced and recorded on the optical disc 20.

The USB interface 18 receives inputs of content data and other data, for example, from an external storage device such as a USB memory and an apparatus such as a digital camera via a USB. These data also can be reproduced and recorded on the optical disc 20.

The flash memory interface 19 connects with, for example, a memory card with a built-in flash memory (for example, a memory card) and receives inputs of content data and other data recorded on this flash memory. These data also can be reproduced and recorded on the optical disc 20.

The selector 28 selects data inputted from any of the above respective interfaces and the optical disc 20 based on a control signal from the CPU 11.

The optical disc drive 21, on which the optical disc 20 can be mounted, can record and reproduce a signal to the optical disc 20. The optical disc drive 21, for example, reads data such as the above moving image data and inputs it to the buffer controller 22. The optical disc 20 is, for example, a DVD (DVD-Video, DVD-RAM, DVD-R, DVD-RW, DVD+R, DVD+RW, or the like), a BD, a CD or the like.

The buffer controller 22 controls the reading timing and data amount of data continuously inputted from the optical disc drive 21 and continuously outputs data such as an MPEG stream intermittently read from the optical disc drive 21 to the Mux/Demux 23.

Further, the buffer controller 22 buffers not only data read from and written to the optical disc 20 but also, for example, stream data inputted for streaming reproduction from the above Ethernet/wireless LAN interface 17, and controls timing of supplying the stream data to the Mux/Demux 23.

The Mux/Demux 23 demultiplexes a multiplexed MPEG stream inputted from the above buffer controller 22 into an MPEG audio stream and an MPEG video stream and outputs them to the CODEC 24, and multiplexes an MPEG audio stream and an MPEG video stream inputted from the CODEC 24 and outputs them to the buffer controller 22 via the selector 28.

The CODEC 24 performs decoding (decompression) processing on the MPEG audio stream and MPEG video stream demultiplexed by the Mux/Demux 23 to convert them into a digital audio signal and a digital video signal, and outputs the digital audio signal to the D/A converter 27 and the digital video signal to the OSD 25. Further, the CODEC 24 performs encoding (compression) processing on the digital audio signal and digital video signal inputted from the buffer controller 22 by a predetermined format and outputs them to the Mux/Demux 23. Incidentally, the CODEC 24 can also output the digital audio signal and digital video signal inputted from the buffer controller 22 as they are to the D/A converter 27 and the OSD 25.

The D/A converter 27 converts the digital audio signal inputted from the above CODEC 24 into an analog audio signal and outputs it for reproduction to the speaker of the digital TV 3, for example, via the dedicated line.

The OSD 25 generates graphics or the like to be displayed on the display of the digital TV 3, performs processing of combining/switching with the above digital video signal, and outputs video data after the processing to the D/A converter 26.

The D/A converter 26 converts the digital video signal subjected to the graphics processing in the OSD 25 into an analog video signal (NTSC (National Television Standards Committee) signal) and outputs it for display to the display of the digital TV 3, for example, via the dedicated line.

Further, in the broadcast data of the above digital broadcasting, in addition to the audio stream and the video stream, a data broadcast signal, a PSI/SI (Program Specific Information/Service Information) signal to transmit EPG (Electronic Program Guide) data or the like, and the like are included. In the above RAM 12 or flash memory 29, the EPG data extracted from the PSI/SI signal or the like is also stored.

Figure 3:
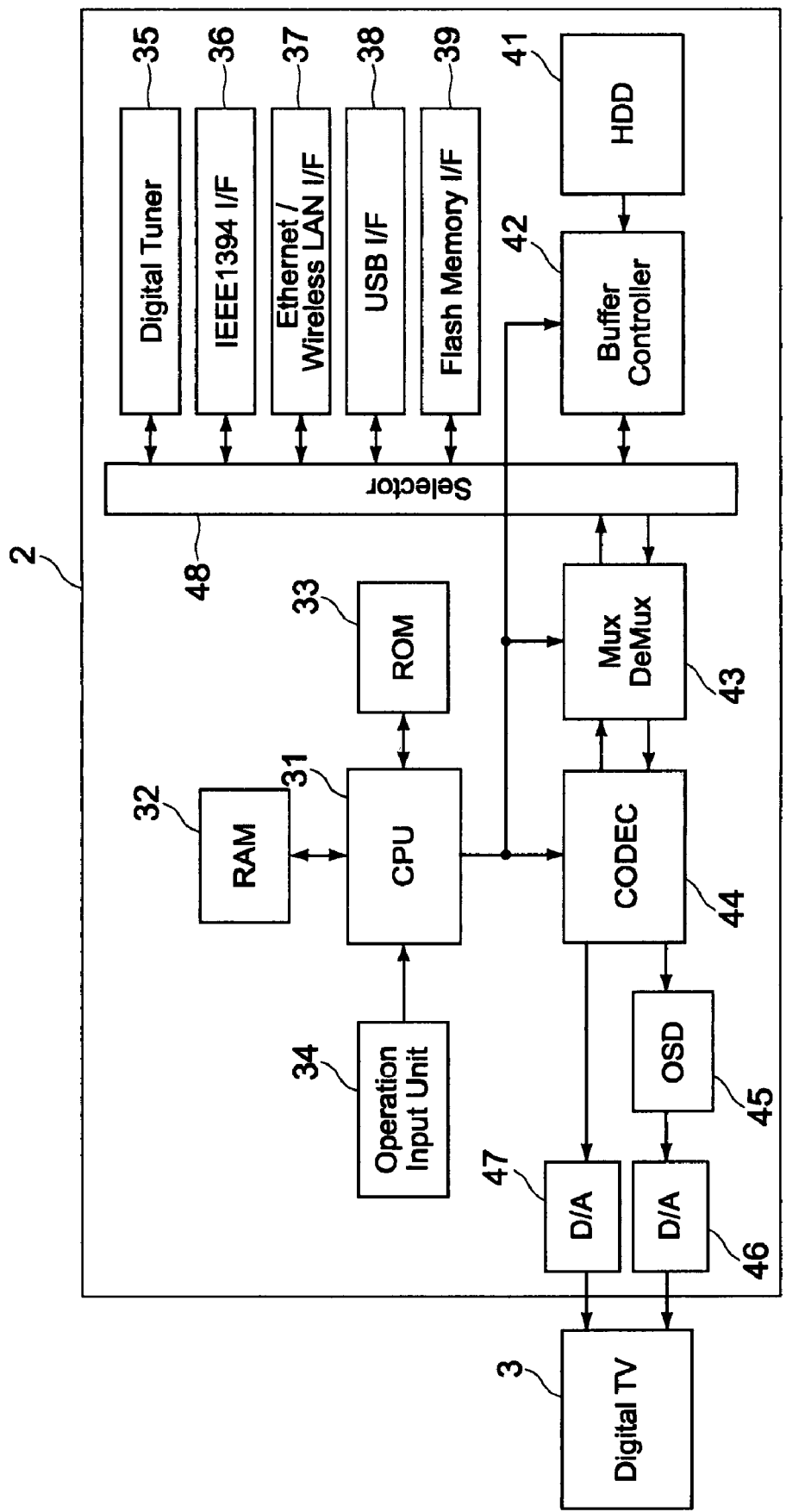
FIG. 3 is a block diagram showing a configuration of a DVR 2 according to the first embodiment of the present invention.

FIG. 3 is a block diagram showing a configuration of the above DVR 2. The DVR 2 includes a HDD 41 in place of the optical disc drive 21 and the flash memory 29 in the above DVR 1. The HDD 41 records content data such as moving image data, various programs, and other data inputted from a digital tuner 35 and other various interfaces on a built-in hard disk, and reads them from this hard disk during reproduction or the like. The above EPG data is also stored in the HDD 41. The configuration other than the above is the same as that of the above DVR 1 shown in FIG. 2, and therefore its description will be omitted.

Figure 4:
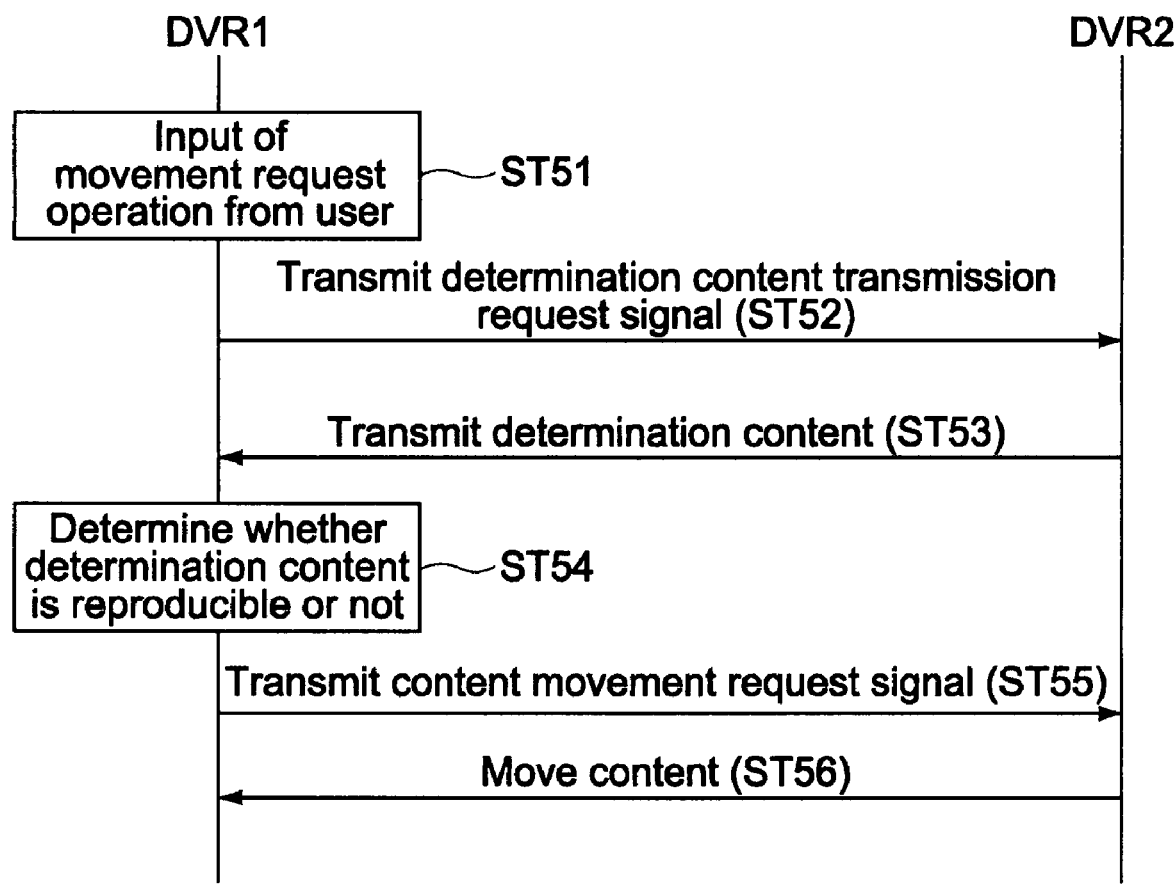
FIG. 4 is a sequence diagram showing a flow of processing when a content is moved from a HDD 41 of the DVR 2 to an optical disc 20 of the DVR 1 in the first embodiment of the present invention.

Next, operations of the DVR 1 and DVR 2 thus configured will be described. As described above, in this embodiment, the DVR 1 and the DVR 2 can move contents between each other via the network 4. An operation when a content is moved from the HDD 41 of the DVR 2 to the optical disc 20 of the DVR 1 will be described below. FIG. 4 is a sequence diagram showing a flow of processing in this case, and FIG. 5 is a flow chart showing a flow of the operation of the DVR 1 in this case.

Figure 5:
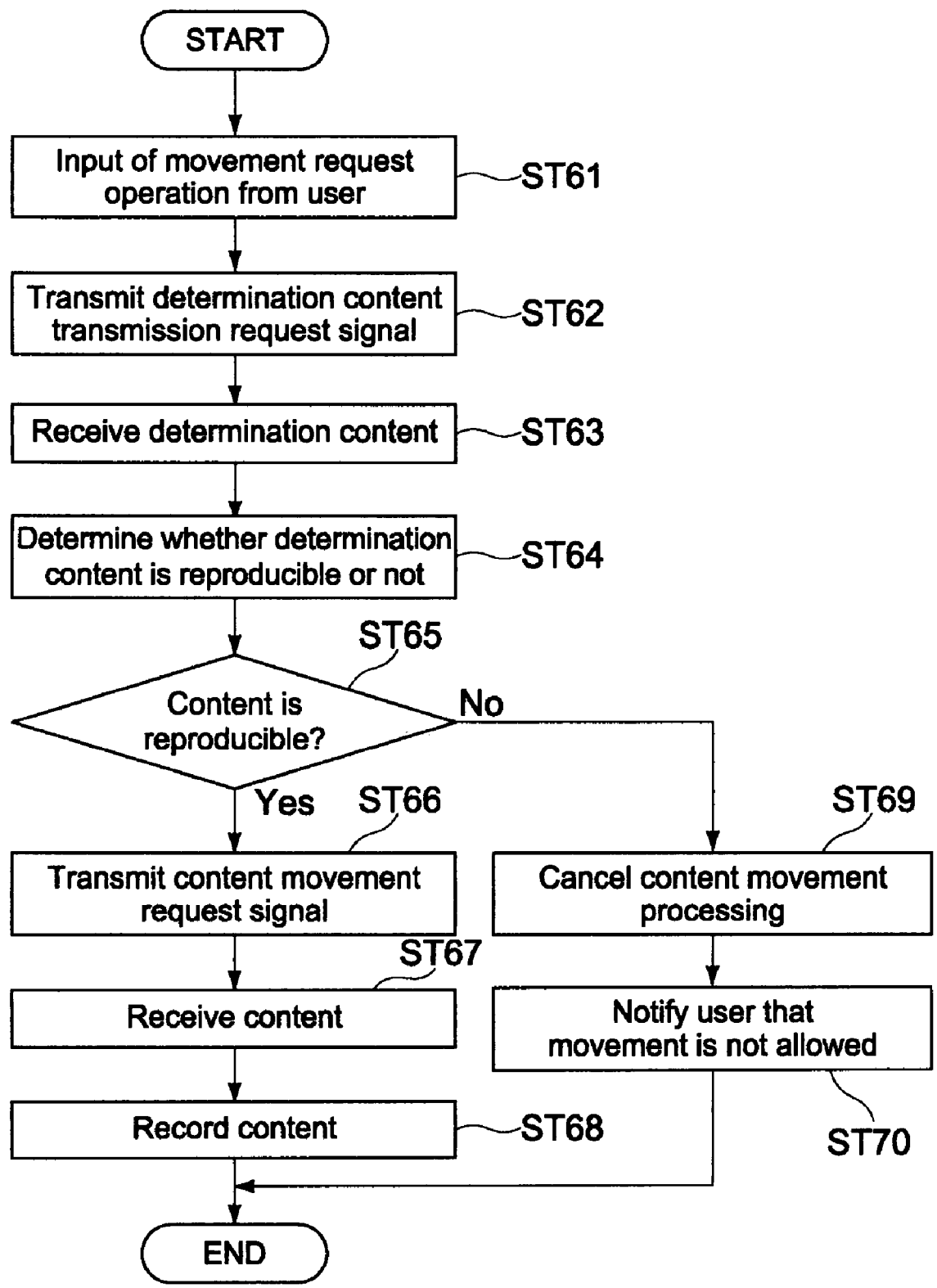
FIG. 5 is a flow chart showing a flow of an operation of the DVR 1 when the content is moved from the HDD 41 of the DVR 2 to the optical disc 20 of the DVR 1 in the first embodiment of the present invention.

As shown in both the figures, first, the CPU 11 of the DVR 1 receives an input of an operation requesting processing of moving a content recorded on the HDD 41 of the DVR 2 to the optical disc of the DVR 1 from the user of the DVR 1 via the operation input unit 14 (step 51 in FIG. 4, step 61 in FIG. 5). Incidentally, this operation input is performed, for example, by the DVR 1 acquiring a list of contents recorded on the HDD 41 of the DVR 2 via the network 4 and allowing the display of the digital TV 3 to display it and then by the user selecting a desired content based on the list.

Subsequently, the CPU 11 of the DVR 1 transmits a transmission request signal requesting transmission of a content as an object of the operation input for determining whether it is reproducible or irreproducible to the DVR 2 via the Ethernet/wireless LAN I/F 17 (step 52 in FIG. 4, step 62 in FIG. 5).

Then, in response to the above transmission request signal, a CPU 31 of the DVR 2 transmits the determination content to the DVR 1 via the network 4 by the Ethernet/wireless LAN I/F 17 (step 53 in FIG. 4), and the DVR 1 receives this determination content by the Ethernet/wireless LAN I/F 17 (step 63 in FIG. 5). Incidentally, the transmission/reception of this determination content is performed, for example, by streaming. The streaming makes, for example, buffering to temporarily store the determination content unnecessary.

The CPU 11 of the DVR 1 tries decoding processing on the received determination content by the CODEC 24 to determine whether this determination content is reproducible or irreproducible in the DVR 1 (step 54 in FIG. 4, step 64 in FIG. 5).

More specifically, the CPU 11 determines whether this determination content is a content encoded by the predetermined format supported by the CODEC 24. Here, the predetermined format is, for example, a video compression format such as MPEG-1, MPEG-2, MPEG-4, or MPEG-4 AVC, an audio compression format such as linear PCM, Dolby digital (AC-3), DTS, ATRAC, MPEG-1 Audio, or MPEG-2 Audio, a multiplexing format such as MPEG-2 PS or MPEG-2 TS, or the like, but not limited to the above. It is difficult to perform decoding processing on a content with a format not supported by the CODEC 24, so that this content is determined to be irreproducible.

Depending on contents, sometimes one content has mixed plurality formats by the user editing and generating the content on his or her own, for example, when the user of the DVR 2 combines a content generated by recording a broadcast program with a content shot by a digital video camera or the like or with a content downloaded via the Internet. As concerns such a content with mixed formats, the CODEC 24 is sometimes not allowed to decode this content from some midpoint even if it can decode it to this midpoint, and in contrast, it can sometimes decode it from the midpoint, so that such a content is also determined as an irreproducible content.

When the determination content is determined to be reproducible by this determination (Yes in step 64), that is, when the CODEC 24 is determined to support the decoding processing of the determination content, the CPU 11 transmits a movement request signal requesting movement of the determined content from the HDD 41 of the DVR 2 to the optical disc 20 of the DVR 1 to the DVR 2 (step 55 in FIG. 4, step 66 in FIG. 5).

In response to this movement request signal, the CPU 31 of the DVR 2 transmits the content to move it from the HDD 41 to the optical disc 20 of the DVR 1 (step 56 in FIG. 4), and the CPU 11 of the DVR 1 receives this content by the Ethernet/wireless LAN I/F 17 (step 67 in FIG. 5) and writes this content to the optical disc 20 by the optical disc drive 21 via the selector 28 and the buffer controller 22 (step 68 in FIG. 5). At this time, the moved content is deleted from the HDD 41 of the DVR 2.

When the determination content is determined to be irreproducible by the above determination (No in step 65), that is, the CODEC 24 is determined not to support the decoding processing of the above determination content, the CPU 11 cancels the content movement processing (step 69 in FIG. 5) and allows the display of the digital TV 3 to display a message to the effect that movement of this content is not allowed (step 70 in FIG. 5).

By the above operation, after the determination of whether a content is reproducible or irreproducible is made, this content is written to the optical disc, which can prevent the irreproducible and useless optical disc 20 from being created and prevent a content from being lost because the content is deleted from the HDD 41 of the DVR 2 due to movement, so that the inconvenience of the user can be avoided.

Second Embodiment

Next, a second embodiment of the present invention will be described. Note that in this embodiment, in addition to the above DVR 1 and DVR 2, plural DVRs, for example, having the same configuration as the DVR 2 are communicable with one another via the network 4. Further, in this embodiment, the basic configurations of the DVR1 and the DVR 2 are the same as those in the above first embodiment, so that their description will be omitted.

In this embodiment, in order that the content recording operation in the above first embodiment is performed more smoothly, it is previously determined whether contents recorded on the DVRs other than the DVR 1 existing on the network 4 are reproducible or irreproducible in the DVR 1 while a content movement request is not made by the user.

Figure 6:
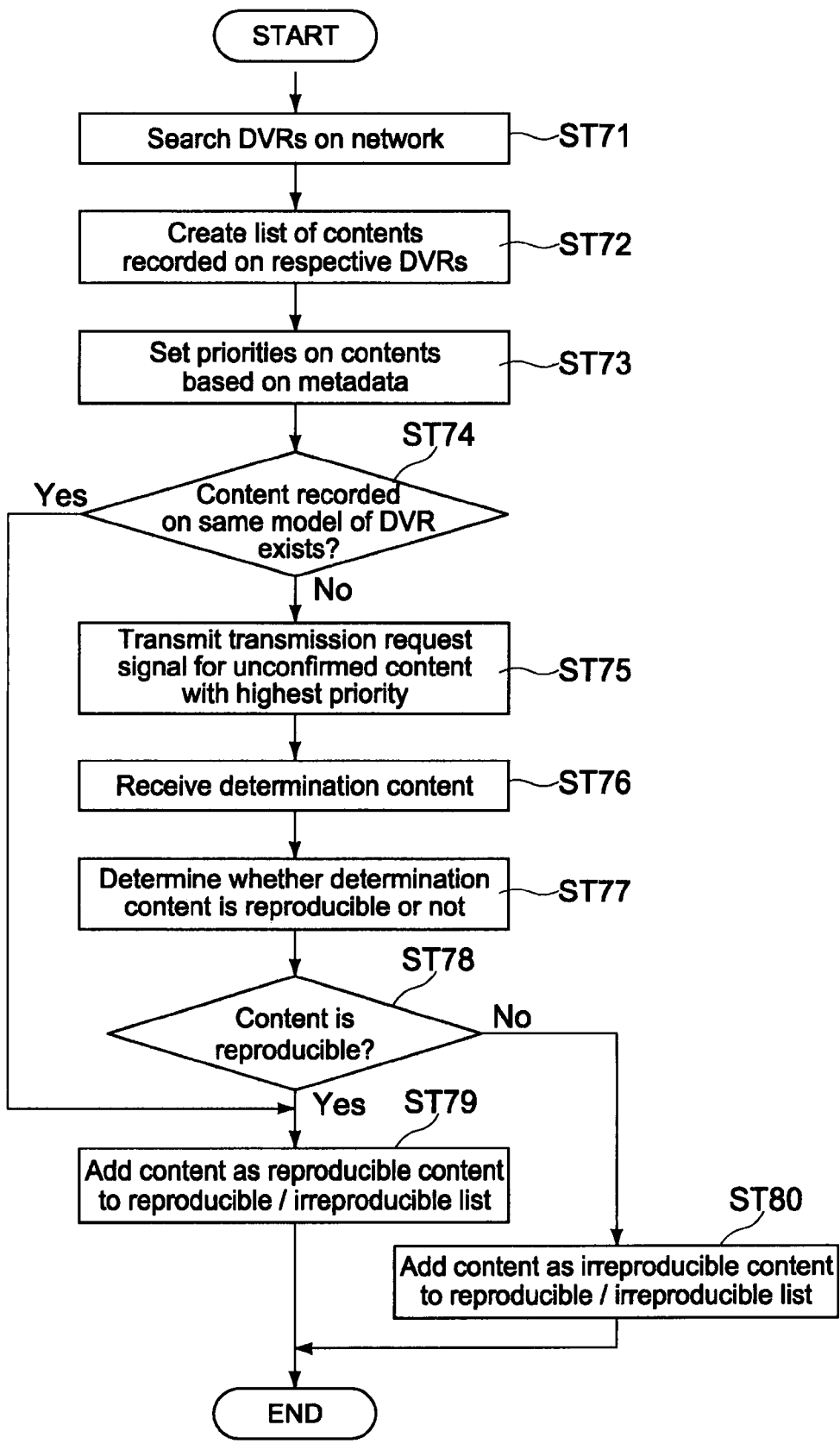
FIG. 6 is a flow chart showing a flow of an operation of the DVR 1 in a second embodiment of the present invention.

FIG. 6 is a flow chart showing a flow of an operation of, the DVR 1 in this embodiment. As shown in this figure, first, the CPU 11 of the DVR 1 searches the DVRs other than the DVR 1 existing on the network 4 (step 71), retrieves contents recorded on HDDs of the respective DVRs, and creates a list of these contents (step 72).

Then, the CPU 11 of the DVR 1 sets priorities on the contents shown on the above content list based on metadata (step 73). Here, the metadata are information such as the titles, performers, categories, broadcast start times and broadcast end times of the contents. These metadata may be acquired from the other DVRs together with titles, for example, when the contents on the above network are retrieved, or, when titles of the respective DVRs are acquired, may be retrieved and extracted based on these titles from within the EPG data stored in the flash memory 29, or by newly acquiring EPG data via the Internet or the like, may be retrieved and extracted based on the above titles from within this EPG data.

The priorities are set in order of decreasing degree of preference of the user for the contents. The CPU 11 saves history information on contents recorded and reproduced in past times in the DVR 1, for example, in the flash memory 29, learns the user's preference based on information such as titles, performers, categories in the history information, and saves it as preference degree information. In this preference degree information, types of contents are prioritized according to their titles, performers, categories, and so on. For example, a content having the same title as a content which has been recorded in the DVR 1 is defined as a highest-ranking content in the preference degree, a content including the same title or keyword information such as a performer as a content recorded and reproduced to the end is defined as a second-ranking content, a content which belongs to the same category as a content recorded and reproduced is defied as a third-ranking content, and any other content is defined as a fourth-ranking content. However, prioritization is not limited to the above prioritizing method, and for example, prioritization may be performed according to the degree of similarity of performers and categories or may be performed according to the degree of approximation of broadcast start/end time with respect to a specific time zone. Alternatively, the user may directly input the preference degree information via the operation input unit 14.

FIG. 7 is a diagram showing an example of the above content list created in the step 72 and prioritized in step 73. As shown in this figure, in this content list, titles of contents recorded on respective DVRs existing on the network, DVR names of the respective DVRs, URLs (IP addresses) on the network 4, and model names of these DVRs are described. The DVR name is a name given so as to be easy for the user to remember, for example, a living room DVR if the DVR 2 is for use in a living room, a 2F DVR when another DVR which is different from the DVR 1 and the DVR 2 is for use on the second floor at home, or a father DVR if another DVR which is different from the other DVR is a DVR for a father, but not limited to such a naming method. The URL is information referred to when the DVR 1 transmits/receives a content movement request signal and a content by the Ethernet/wireless LAN I/F 17. The model name is information such as model numbers such as "DVR-xyz" or "DVR-abc-1". This content list is stored, for example, in the flash memory 29 of the DVR 1. Further, the DVR 1 stores not only model names of the other DVRS but also its own model name, for example, in the flash memory 29 or in the ROM 13.

Then, the CPU 11 compares the model names of the other DVRS in the above created content list and its own model name and confirms whether any content recorded on the same model of DVR as the DVR 1 exists (step 74). When it is determined in step 74 that the content recorded on the same model of DVR exists (Yes), the CPU adds this content as a reproducible content to a reproducible/irreproducible list (described later) describing whether contents are reproducible or irreproducible (step 79). This is because the possibility that this content is reproducible is extremely high since in the case of the same model, the DVR has a similar CODEC. Incidentally, the identity of models may be determined by comparing model IDS, serial numbers, or the like instead of model names.

When the content recorded on the same model of DVR does not exist in step 74 (No), the CPU 11 transmits a transmission request signal to the DVR 2 to request transmission of a content which has the highest priority in the above prioritized content list and concerning which the determination of whether it is reproducible or irreproducible has not been made yet (step 75).

Subsequently, the CPU 11 receives the above highest-priority content by the Ethernet/wireless LAN I/F 17 via the network 4 (step 76), and as in the above first embodiment, it is determined whether this content is reproducible or irreproducible by trying the decoding processing on this content (step 77). If the content is determined to be reproducible in step 77 (Yes), the CPU 11 adds this content as a reproducible content to the above reproducible/irreproducible list (step 79), and if the content is determined to be irreproducible (No), it adds this content as an irreproducible content to the reproducible/irreproducible list and ends the operation (step 80).

FIG. 8 is a diagram showing the reproducible/irreproducible list. As shown in this figure, in the reproducible/irreproducible list, in addition to titles of contents, DVR names of DVRS on which these contents are recorded, ULRs of these DVRS, information as to whether these contents have been already determined or not (confirmed/unconfirmed) and whether the contents are reproducible or irreproducible (OK/NG) as a result of the determination are described on a content-by-content basis, and the contents are ranked based on the above priorities. This reproducible/irreproducible list is also stored, for example, in the above flash memory 29.

After the above operation, every time the user makes a movement request for a content recorded on any of DVRs other then the DVR 1, referring to the above reproducible/irreproducible list, if a content to be recorded is reproducible, the CPU 11 moves the content to the optical disc 20, and if a content to be recorded is irreproducible, the CPU 11 displays a message to this effect.

Incidentally, it is also possible that when the user requests recording to the optical disc 20, the user is allowed to refer to the above reproducible/irreproducible list and select a reproducible content from the above reproducible/irreproducible list. Consequently, the user makes the movement request only for the reproducible content, so that the processing for the CPU 11 to display a message that the content is irreproducible can be omitted, whereby the operation useless to the user also can be omitted.

By the above operation, it is determined whether contents on the network 4 are reproducible or irreproducible while a movement request of the user is not made, and the results of determination are described in the above reproducible/irreproducible list, so that compared to when, after a movement request of the user is made, it is determined whether a corresponding content is reproducible or irreproducible, the recording processing can be performed more smoothly, which can improve user friendliness. Further, the determination of whether a content is reproducible or irreproducible is performed preferentially from a content with a high preference degree based on the user's preference degree information on contents, and hence when the user makes a movement request for some content, there is a high possibility that whether this content is reproducible or irreproducible has been already determined, which can further improve user friendliness. Furthermore, useless determination processing for a content with a low user's preference degree, that is, with a low possibility that the user makes a movement request is prevented, which can reduce the processing burden on the CPU 11.

It is, of course, to be understood that the present invention is not intended to be limited only to the above embodiments and various changes may be made therein without departing from the spirit of the present invention.

In the above first and second embodiments, when a content is determined to be irreproducible, the DVR 1 displays a message to this effect and adds this content as an irreproducible content to the reproducible/irreproducible list, but the DVR 1 may ask another DVR to convert this content into a reproducible format.

For example, in the flow chart of FIG. 5 in the above first embodiment, when the determination content is determined to be irreproducible in step 65 (No), instead of canceling the movement processing (step 69) and displaying the message to the effect that movement is not allowed (step 70), the CPU 11 may transmit a conversion request signal requesting to convert this determination content into a format reproducible in the DVR 1 to the DVR 2, receive the content after format conversion from the DVR 2, and record this content on the optical disc 20. Further, also in the flow chart of FIG. 6 in the above second embodiment, the same processing may be performed instead of step 80. When it is determined whether a content is reproducible or irreproducible, the CPU 11 determines a format of the content to be determined, for example, by determining a maximum bit rate or an average bit rate of this content, a type of a necessary CODEC, and the like, for example, by analyzing profile information or the like included in the content, and requests the DVR 2 to convert (reencode) the determined content into a format supported by the CODEC 24 of the DVR 1.

Thus, the content determined to be irreproducible in the DVR 1 is subjected to format conversion by another DVR, and consequently, any content can be recorded on the DVR 1, which can improve user friendliness.

Further, in the above two embodiments, the example in which the content is moved from the HDD of the DVR 2 to the optical disc 20 of the DVR 1 is shown, but without being limited to this pattern, for example, when the DVR 1 includes a HDD, the present invention can be applied to a case where a content is moved from the HDD 41 of the DVR 2 to the HDD of the DVR 1. In this case, the DVR 1, like the DVR 2, can function as a DVR being a source of movement of a content. Accordingly, the CPU 11 of the DVR 1 also can transmit a content from its own HDD to another DVR in accordance with a request from the other DVR such as the DVR 2 and subject a content irreproducible in the other DVR to format conversion in accordance with a request from the other DVR.

In the above embodiments, the example in which when it is determined whether a content is reproducible or irreproducible, the determination content is received once in a streaming manner and if the content is determined to be reproducible, the content is received again is shown, but when the DVR 1 has a sufficient buffer area in the RAM 12, the flash memory 29, or the like, the determination content received from the DVR 2 may be temporarily saved with this RAM 12 or flash memory 29 as a buffer memory, and transferred to the optical disc when it is determined to be reproducible. This can save the trouble of receiving the content twice and reduce processing burden.

In the above embodiments, in the processing of determining whether a content is reproducible or irreproducible, the CODEC 24 may perform decode processing at a higher speed compared to normal reproduction processing. This makes speedier determination processing possible. Further, the DVR 1 may further include a CODEC exclusively for the processing of determining whether a content is reproducible or irreproducible in addition to the CODEC 24.

In the above embodiments, the example in which it is determine whether a content existing in another DVR such as the DVR 2 is reproducible or irreproducible in the DVR 1 and then this content is moved to the DVR 1 is shown, but the present invention is also applicable, for example, to a case where a content in the DVR 2 is received by the DVR 1 in a streaming manner and reproduced. In this case, after it is previously determined on the DVR 1 side whether the content to be subjected to streaming is reproducible or irreproducible, only the reproducible content may be received from the DVR 1 in the streaming manner.

In the above embodiments, the network 4 is constituted by the home LAN, but it is, of course, possible that contents may be exchanged not only in the home but also, for example, by connecting the user's home, the outside of the user's home, the office, and so on by the Internet.

In the above embodiments, the description is given with the system in which the plural DVRs and the digital TV as electronic apparatuses are connected by the network as an example, but the types and numbers of electronic apparatuses connected to the network are not limited to the above. The system can be constructed by connecting various electronic apparatuses such as PCs, game machines, DVD players, portable telephones, PDAS in place of the respective video recorders.

Further, in the above embodiments, the description is given with the video content of the broadcast program as an example of the content, but the content is not limited to the above, and various contents including an audio content such as music, a text content such as an electronic book, and so on can be used.

It should be understood by those skilled in the art that various modifications, combinations, sub-combinations and alternations may occur depending on design requirements and other factors insofar as they are within the scope of the appended claims or the equivalents thereof.

The invention claimed is:

1. An electronic apparatus communicable with another electronic apparatus via a network, comprising:
   receiving means for receiving a content recorded on a first recording medium of the other electronic apparatus from the other electronic apparatus;
   determining means for determining whether the received content is reproducible or irreproducible by decoding the content;
   recording means for recording the content on a second recording medium of the electronic apparatus if the content is determined to be reproducible; and
   means for transmitting a retransmission request requesting retransmission of the content determined to be reproducible by the determining means to the other electronic apparatus,
   wherein the receiving means receives the content retransmitted from the other electronic apparatus based on the retransmission request, and
   wherein the recording means records the retransmitted and received content.

2. The electronic apparatus as set forth in claim 1, further comprising:
   a buffer memory for temporarily storing the received content,
   wherein the recording means includes means for transferring the content from the buffer memory to the second recording medium if the content is determined to be reproducible by the determining means.

3. The electronic apparatus as set forth in claim 1, further comprising:
   reproducing means for reproducing the content recorded on the second recording medium by decoding the content at a first speed,
   wherein the determining means decodes the content at a second speed faster than the first speed.

4. The electronic apparatus as set forth in claim 1, further comprising:
   storing means for generating a reproducible/irreproducible list describing whether the content is reproducible or irreproducible based on a result of the determination and storing the reproducible/irreproducible list.

5. The electronic apparatus as set forth in claim 1, further comprising:
   means for transmitting a conversion request information requesting to convert the content into a reproducible recording format to the other electronic apparatus if the content is determined to be irreproducible by the determining means,
   wherein the receiving means receives the converted content from the other electronic apparatus.

6. An electronic apparatus communicable with another electronic apparatus via a network, comprising:
   receiving means for receiving a content recorded on a first recording medium of the other electronic apparatus from the other electronic apparatus;
   determining means for determining whether the received content is reproducible or irreproducible by decoding the content;
   recording means for recording the content on a second recording medium of the electronic apparatus if the content is determined to be reproducible; and
   storing means for generating a reproducible/irreproducible list describing whether the content is reproducible or irreproducible based on a result of the determination and storing the reproducible/irreproducible list,
   wherein the receiving means receives attribute information on contents recorded on the first recording medium of the other electronic apparatus,
   wherein the storing means stores preference degree information on the contents of a user, and
   wherein the determining means preferentially determines whether a content with a high preference degree out of the contents recorded on the first recording medium is reproducible or irreproducible, based on the received attribute information and the stored preference degree information.

7. The electronic apparatus as set forth in claim 6, further comprising:
   means for causing the reproducible/irreproducible list to be displayed; and
   means for inputting a user operation requesting recording of the contents described in the reproducible/irreproducible list based on the displayed reproducible/irreproducible list.

8. An electronic apparatus communicable with another electronic apparatus via a network, comprising:
   receiving means for receiving a content recorded on a first recording medium of the other electronic apparatus from the other electronic apparatus;
   determining means for determining whether the received content is reproducible or irreproducible by decoding the content;
   recording means for recording the content on a second recording medium of the electronic apparatus if the content is determined to be reproducible; and
   means for storing a first model information on a model of the electronic apparatus,
   wherein the receiving means receives a second model information on a model of the other electronic apparatus from the other electronic apparatus, and
   wherein the determining means determines that the content is reproducible without decoding the content if the stored first model information and the received second model information matches.

9. A content recording method by which an electronic apparatus communicable with another electronic apparatus via a network records a content, the method comprising:

receiving a content recorded on a first recording medium of the other electronic apparatus from the other electronic apparatus;

determining whether the received content is reproducible or irreproducible by decoding the content; and recording the content on a second recording medium of the electronic apparatus if the content is determined to be reproducible; and transmitting a retransmission request requesting retransmission of the content determined to be reproducible to the other electronic apparatus, wherein the content retransmitted from the other electronic apparatus is received by the electronic apparatus based on the retransmission request, and wherein the retransmitted and received content is recorded by the electronic apparatus.

10. A computer readable storage memory having stored thereon a program that causes an electronic apparatus to function as an apparatus communicable with another electronic apparatus via a network, the program comprising:

receiving a content recorded on a first recording medium of the other electronic apparatus from the other electronic apparatus;

determining whether the received content is reproducible or irreproducible by decoding the content; and recording the content on a second recording medium of the electronic apparatus if the content is determined to be reproducible; and transmitting a retransmission request requesting retransmission of the content determined to be reproducible to the other electronic apparatus, wherein the content retransmitted from the other electronic apparatus is received by the electronic apparatus based on the retransmission request, and wherein the retransmitted and received content is recorded by the electronic apparatus.

11. An electronic apparatus communicable with another electronic apparatus via a network, comprising:

receiving unit to receive a content recorded on a first recording medium of the other electronic apparatus from the other electronic apparatus;

determining unit to determine whether the received content is reproducible or irreproducible by decoding the content; and recording unit to record the content on a second recording medium of the electronic apparatus if the content is determined to be reproducible; and transmitting unit to transmit a retransmission request requesting retransmission of the content determined to be reproducible by the determining unit to the other electronic apparatus, wherein the receiving unit receives the content retransmitted from the other electronic apparatus based on the retransmission request, and wherein the recording units records the retransmitted and received content.

* * * * *